United States Patent
Lauer et al.

(10) Patent No.: US 10,028,244 B2
(45) Date of Patent: Jul. 17, 2018

(54) HYPER-NUMBER PORTABILITY

(71) Applicant: GOGO LLC, Chicago, IL (US)

(72) Inventors: Bryan Adrian Lauer, Hinckley, IL (US); Michael Metz, Glenview, IL (US)

(73) Assignee: GOGO LLC, Chicago, IL (US)

( * ) Notice: Subject to any disclaimer, the term of this patent is extended or adjusted under 35 U.S.C. 154(b) by 196 days.

(21) Appl. No.: 15/202,727

(22) Filed: Jul. 6, 2016

(65) Prior Publication Data
US 2018/0014269 A1    Jan. 11, 2018

(51) Int. Cl.
| | | |
|---|---|---|
| *H04W 60/04* | (2009.01) | |
| *H04L 29/08* | (2006.01) | |
| *H04W 8/28* | (2009.01) | |
| *H04W 76/02* | (2009.01) | |
| *H04W 12/08* | (2009.01) | |
| *H04W 76/11* | (2018.01) | |

(Continued)

(52) U.S. Cl.
CPC ............. *H04W 60/04* (2013.01); *H04L 67/12* (2013.01); *H04W 8/28* (2013.01); *H04W 12/08* (2013.01); *H04W 60/005* (2013.01); *H04W 64/00* (2013.01); *H04W 76/021* (2013.01); *H04W 76/11* (2018.02)

(58) Field of Classification Search
CPC ... H04W 60/04; H04W 60/005; H04W 64/00; H04W 76/11; H04W 8/28; H04W 67/12; H04W 12/08; H04W 4/046; G06F 8/654; G06N 5/025; G07C 5/008; H04M 15/43
See application file for complete search history.

(56) References Cited

U.S. PATENT DOCUMENTS

| | | |
|---|---|---|
| 6,321,084 B1 | 11/2001 | Horrer |
| 6,650,902 B1 | 11/2003 | Richton |
| 7,626,951 B2 | 12/2009 | Croy et al. |

(Continued)

FOREIGN PATENT DOCUMENTS

EP    1863194 A1    12/2007

OTHER PUBLICATIONS

International Search Report for PCT/US2017/036726 dated Aug. 25, 2017.
Written Opinion of PCT/US2017/036726 dated Aug. 25, 2017.

*Primary Examiner* — Le H Luu
(74) *Attorney, Agent, or Firm* — Marshall, Gerstein & Borun LLP; Randall G. Rueth (57) ABSTRACT

Systems and methods are provided to support hypernumber portability for a hypernumber number corresponding to an electronic device. The electronic device may include an installed application to facilitate hypernumber portability. To this end, when the electronic devices connects to a wireless network, the electronic device may request a vehicle identification. If the wireless network is a vehicle-based network, the electronic device may receive the vehicle identification from an on-board node. When the received vehicle identification indicates that the electronic device has changed locations, the electronic device may communicate with a hypernumber database and/or a hypernumber server to update a dynamic phonebook. As a result, as the electronic device traverses a transport network, the dynamic phonebook may maintain updated location and call routing information for the electronic device.

20 Claims, 6 Drawing Sheets

(51) Int. Cl.
*H04W 60/00* (2009.01)
*H04W 64/00* (2009.01)

(56) References Cited

U.S. PATENT DOCUMENTS

| | | | |
|---|---|---|---|
| 7,945,259 B2 | 5/2011 | Radpour | |
| 8,280,344 B2 | 10/2012 | O'Reilly | |
| 8,331,971 B2 | 12/2012 | Turcanu | |
| 9,536,197 B1* | 1/2017 | Penilla | G06N 5/025 |
| 2003/0027560 A1 | 2/2003 | Jammal | |
| 2003/0144014 A1 | 7/2003 | Kumhyr | |
| 2004/0110472 A1 | 6/2004 | Witkowski et al. | |
| 2007/0206566 A1 | 9/2007 | Bennett | |
| 2008/0129475 A1* | 6/2008 | Breed | G07C 5/008 |
| | | | 340/438 |
| 2010/0189245 A1* | 7/2010 | Raj | H04M 15/43 |
| | | | 379/207.02 |
| 2012/0203915 A1 | 8/2012 | Moeller et al. | |
| 2013/0130686 A1 | 5/2013 | Ikeda et al. | |
| 2014/0380442 A1* | 12/2014 | Addepalli | H04W 4/046 |
| | | | 726/6 |
| 2015/0024725 A1 | 1/2015 | Lang et al. | |
| 2015/0033296 A1 | 1/2015 | Yoshimura et al. | |
| 2016/0306624 A1* | 10/2016 | Vangelov | G06F 8/654 |

\* cited by examiner

HYPER-NUMBER PORTABILITY

TECHNICAL FIELD

The following disclosure relates to systems and methods for updating a dynamic phonebook, and more particularly, for automatically updating a dynamic phonebook as an electronic device and/or as a vehicle traverses a transport network.

BACKGROUND

Transport operations centers need to be able to communicate with transport personnel for many reasons. For aviation scenarios, some reasons include a flight being delayed, a flight needing to be re-routed, discovery of an maintenance issue, or general status check-ins. Traditionally, to reach particular personnel, the operations center would dial a phone number of a phone that is fixed at a particular location. For example, an aircraft may have a fixed number for a phone located at a cockpit, a flight attendant station near the nose of the plane, and/or a flight attendant station near the tail of the plane. Similarly, a port, such as an airport gate, may also be associated with a fixed number.

Increasingly, transport personnel are permitted to utilize their own, or company-subsidized, personal electronic devices on the job as part of the Bring Your Own Device (BYOD) movement. However, unlike the fixed phones transport operation centers traditionally have dialed, the phone numbers associated with personal electronic devices are not tied to a known location. Thus, as transport personnel board different vehicles that depart from different ports, the transport operations center may not know the location of particular personnel and, relatedly, the appropriate number to dial in order to reach personnel at a particular location. Accordingly, there is a need to enable transport operations to originate calls to the personal electronic devices of personnel as the personnel traverse the transport network.

SUMMARY OF THE DISCLOSURE

In one embodiment, a method for facilitating hypernumber portability on an electronic device is provided. The electronic device may have one or more processors and an application executing on the electronic device. The method may comprising (1) connecting, by the electronic device, to a wireless network corresponding to a vehicle; (2) in response to connecting to the wireless network, the application causing the electronic device to transmit, via the wireless network, a request for an identity of the vehicle; (3) receiving, by the electronic device and via the wireless network, the identity of the vehicle; and (4) the application causing the electronic device to transmit, to a hypernumber server or a centralized hypernumber database that includes a dynamic phonebook, the identity of the vehicle, wherein transmitting the identity of the vehicle causes the centralized hypernumber database to associate the electronic device with the vehicle.

In another embodiment, a system is provided. The system may comprise one or more processors; and one or more non-transitory, computer-readable storage media storing computer-executable instructions. A portion of the instructions may be included in a hypernumber application. When the instructions are executed by the one or more processors, the instructions may cause the system to (1) connect to a wireless network corresponding to a vehicle, (2) in response to connecting to the wireless network, transmit, via the wireless network, a request for an identity of the vehicle, (3) receive, via the wireless network, the identity of the vehicle, and (4) transmit, to a hypernumber server or a centralized hypernumber database that includes a dynamic phonebook, the identity of the vehicle, wherein transmitting the identity of the vehicle causes the centralized hypernumber database to associate the electronic device with the vehicle.

In yet another embodiment, a non-transitory computer-readable storage medium storing processor-executable instructions is provided. The instructions, when executed, cause one or more processors to (1) connect to a wireless network corresponding to a vehicle; (2) in response to connecting to the wireless network, transmit, via the wireless network, a request for an identity of the vehicle; (3) receive, via the wireless network, the identity of the vehicle; and (4) transmit, to a hypernumber server or a centralized hypernumber database that includes a dynamic phonebook, the identity of the vehicle, wherein transmitting the identity of the vehicle causes the centralized hypernumber database to associate the electronic device with the vehicle.

DETAILED DESCRIPTION

It should be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

As it is used generally herein, the term "hypernumber" generally refers to a phone number associated with metadata indicative of call routing information. To this end, when a calling party originates a call to a hypernumber, a hypernumber server may query the routing information to route the call messaging accordingly. In an embodiment, a hypernumber may correspond to a smartphone of a flight attendant. When the flight attendant is located at terrestrial locations, the smartphone may be reachable by traditional wireless networks. However, when the flight attendant is aboard an airborne aircraft, the smartphone may only be reachable via an air-to-ground and/or a satellite network. Accordingly, the metadata associated with the hypernumber may track the location of the smartphone to determine whether the flight attendant is located terrestrially or aboard an airborne aircraft. As a result, when a calling party originates a call to the smartphone using the hypernumber, the hypernumber server may ensure that call messaging is routed over the appropriate wireless network to actually be able to communicate with the smartphone. As another example scenario, a smartphone of a ship crew member may only be reachable via a satellite network and/or an auxiliary wireless network when the ship is in deep water. In this example, the hypernumber corresponding to the ship crew member's smartphone may track whether the smartphone is terrestrially located or aboard a ship in deep water. Consequently, the term "hypernumber portability" refers to the ability to route a call to an electronic device having a hypernumber as the electronic device traverses a transport network.

In many scenarios, a transport operator has many employees that may be located at any number of locations throughout the course of their employment. Accordingly, a transport operator may maintain a centralized hypernumber database. This centralized hypernumber database may store the current location and corresponding routing information associated with each hypernumber as electronic devices traverse the transport network. Because the routing and/or location information for a particular hypernumber may change over time, the centralized hypernumber database may be referred to as a "dynamic phonebook." It should be appreciated that the dynamic phonebook may include additional data beyond the aforementioned routing information. For example, a hypernumber may be associated with a name, a role, an occupation, a company, and so on.

According to aspects, a transport operations center may interact with the dynamic phonebook to originate calls to personnel reachable via hypernumbers. By maintaining updated location and/or routing information with each hypernumber, the dynamic phonebook may further enable to origination of group calls to a class of personnel meeting a search query. For example, the transport operations center may be able to originate a call to all personnel aboard a particular vehicle, located at a particular port, in route to a particular destination, and/or any other type of data maintained by the dynamic phonebook.

Traditionally, electronic devices are configured without any hypernumber capabilities. Instead, these capabilities may be included as part of an application that is installed on an electronic device. In some scenarios, the application may be installed after the original factory provisioning. In other scenarios, the application may be included in a company-specific image installed on electronic devices specifically configured for use by the company's employees. In any event, the installed application may enable the electronic device to communicate with a dynamic phonebook such that the electronic device updates the dynamic phonebook whenever the electronic device is located at a new location.

As it is used generally herein, "location" is intended to generally refer to a location with respect to a transport network and not necessarily an absolute location, e.g., a satellite or GPS coordinate. Accordingly, a location may include an identity of a particular port (e.g., a gate or port number), an identity of a particular vehicle (e.g., a tail or hull number), a port status (e.g., in port, taxiing, in transit, home and/or otherwise off board, and so on), and/or other information relating to a position of a vehicle and/or electronic device relative to a transport network. In some implementations, each vehicle is equipped with a vehicle-based network to facilitate communications for electronic devices disposed aboard the vehicle. Accordingly, location may be determined based upon which vehicle-based network an electronic device is currently connected. Similarly, in some implementations, ports may also be associated with a port-specific wireless network. Accordingly, in these implementations, location may be determined based upon which port-specific and/or vehicle-based network an electronic device is currently connected.

Past attempts for location-based call routing for transport personnel have relied upon scheduling data supplied by a transport operator. Conversely, the presently disclosed hypernumber based routing relies upon a location as determined by a network to which the electronic device is connected. Relying upon a network to which the electronic device is connected may accurately reflect location than relying on scheduling information. To this end, a transport network may experience delays and/or crew members may fail to show up to work. Because scheduling information is not tied to a location of an electronic device, when reality fails to align with the schedule, the schedule-based solution for location-based routing determinations tend to report inaccurate locations. On the other hand, an electronic device cannot connect to a wireless network unless the electronic device is within the network footprint for the wireless network. Thus, determining the location in the manner discussed herein will reflect the actual location of the electronic device regardless of any delays in the transport network or unpredicted behavior by crew members.

It should be appreciated that although the location determination described herein does not rely upon scheduling data, the scheduling data may be otherwise utilized by the dynamic phonebook. For example, when a smartphone is determined to be located aboard a particular vehicle, in some embodiments, the scheduling data may be relied upon to determine a destination port for the particular vehicle. As another example, the scheduling data may also indicate when an employee not aboard a vehicle is located at a base location (e.g., a home city) or at a transient location (e.g., a city the employee stays overnight throughout a course of travel).

Figure 1:
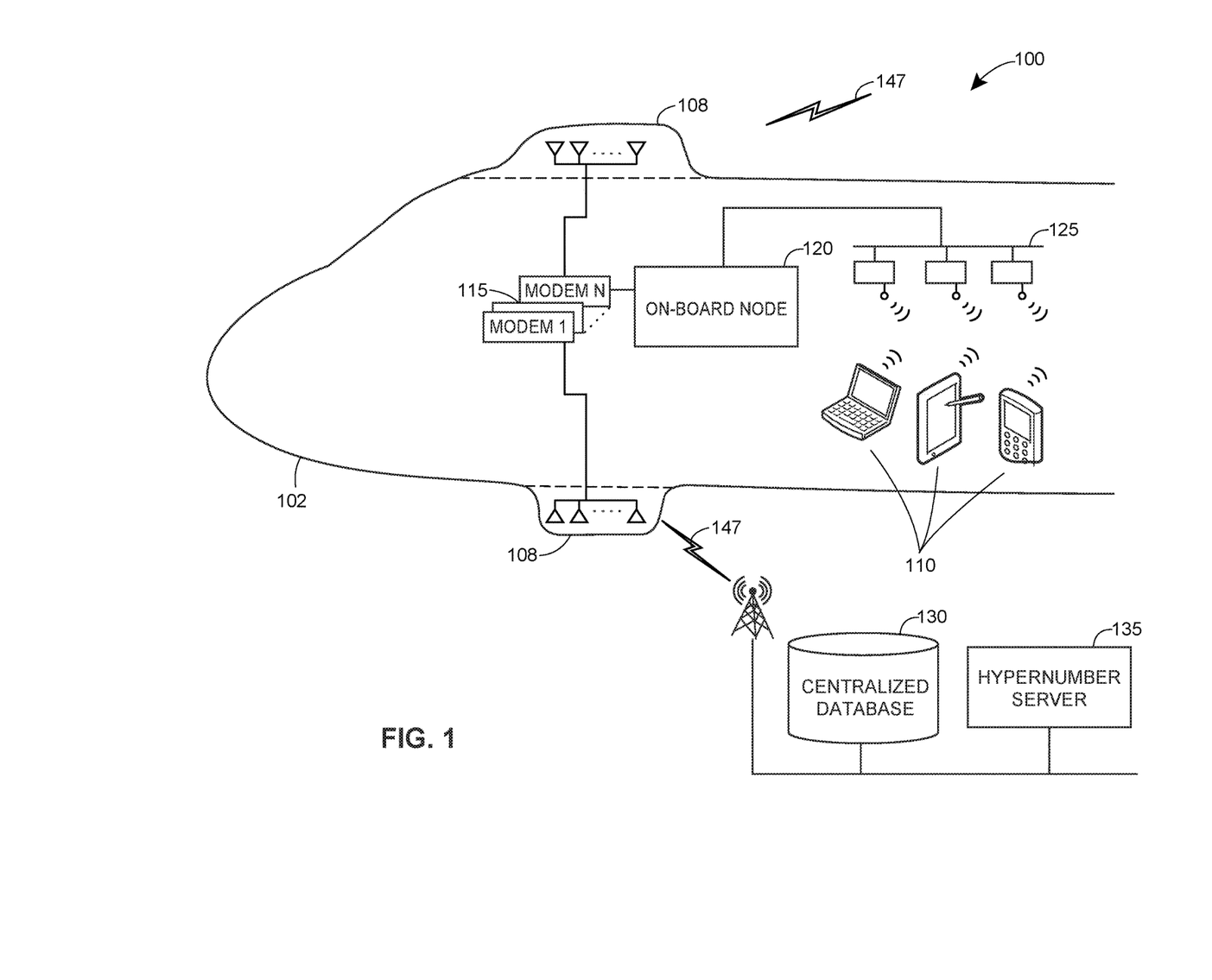
FIG. 1 depicts an embodiment of an exemplary system capable of updating a dynamic phonebook as personal electronic devices an/d or vehicles traverse a transport network, as disclosed herein.

FIG. 1 depicts an example environment 100 capable of supporting the hypernumber capabilities described herein. The environment 100 may include a vehicle 102. Although the vehicle 102 is depicted as an airplane, it is envisioned that the vehicle 102 may be any vehicle, for example, a bus, a train, a subway, a helicopter, a ship, a subway, a balloon, etc. The vehicle 102 may include a vehicle-based network that enables electronic devices 110 to engage in communications while aboard the vehicle 102. To this end, the electronic devices 110 may interact with the vehicle-based network via one or more access points 125. The electronic devices 110 may include any mobile computing device, such as a smartphone, a tablet, a laptop computer, a personal digital assistant, an e-reader, smart glasses, smart watches, or any other mobile computing device capable of wireless communications. According to aspects, the electronic devices 110 may be capable of interacting with the access points 125 via one or more communication protocols, including TDMA, GSM, CDMA, GSM, LTE, WiMAX, Wi-Fi (IEEE 802.11), and so on. Furthermore, the electronic devices 110 may have an application installed thereon to support the hypernumber capabilities described herein.

The vehicle-based network may also include an on-board node 120, such as an Auxiliary Computer Power Unit (ACPU). The on-board node 120 may be a computing device communicatively connected to an external communication link 147 via the one or more modems 115. The modems 115 may correspond to a particular communication protocol (e.g., TDMA, GSM, CDMA, GSM, LTE, WiMAX, Wi-Fi, etc.) and/or to a particular frequency band (e.g., $K_a$ band, $K_u$ band, L band, S band, Cellular band, AWS Band, PCS band, an LTE band, etc.). In an embodiment, the plurality of modems 115 may be connected to at least one respective antenna 108 for transmitting communications over the external communication link 147 using the particular communication protocol and/or at the particular frequency band. As depicted in FIG. 1, the vehicle 102 may be associated with multiple external communication links 147. For example, the vehicle 102 may be associated with an air-to-ground (ATG) communication link, as well as a satellite-based communication link. As another example, the external communication links 147 may include a communication link for one or more traditional terrestrial wireless networks (e.g., Verizon, AT&T, Sprint, T-Mobile, etc.).

According to aspects, the on-board node 120 may process any data received at the access points 125 from the electronic devices 110. The on-board node 120 may determine that some of the data transmitted by the electronic devices 110 is addressed to a location external to the vehicle 102. Accordingly, the on-board node 120 may route the communications over the external communication link 147 via the modems 115 to a terrestrial base station 145 for routing to the data's addressed destination. As an example, data that comprises a hypernumber location update may have an ultimate destination of a hypernumber database 130 and/or a hypernumber server 135. In one scenario, the hypernumber location update may be transmitted by one of the electronic devices 110 in response to connecting to the vehicle-based network.

The external communication link 147 may also be used to receive data onto the vehicle 102 via the antennas 108. For example, a network operations center (NOC, not depicted) may originate a call to one or more of the electronic devices 110. The NOC may be interconnected with the hypernumber server 135 that detects when a call is originated to one of the electronic devices 110. When the hypernumber server 135 detects the call origination from the NOC to one or more of the electronic device 110, the hypernumber server may query the centralized database 130 to determine the appropriate external communication link 147 over which to route the call origination message for each of the one or more of the electronic devices 110. The hypernumber server 135 may then route the origination message to the one or more of the electronic devices 110 over the appropriate external communication link 147.

Figure 2:
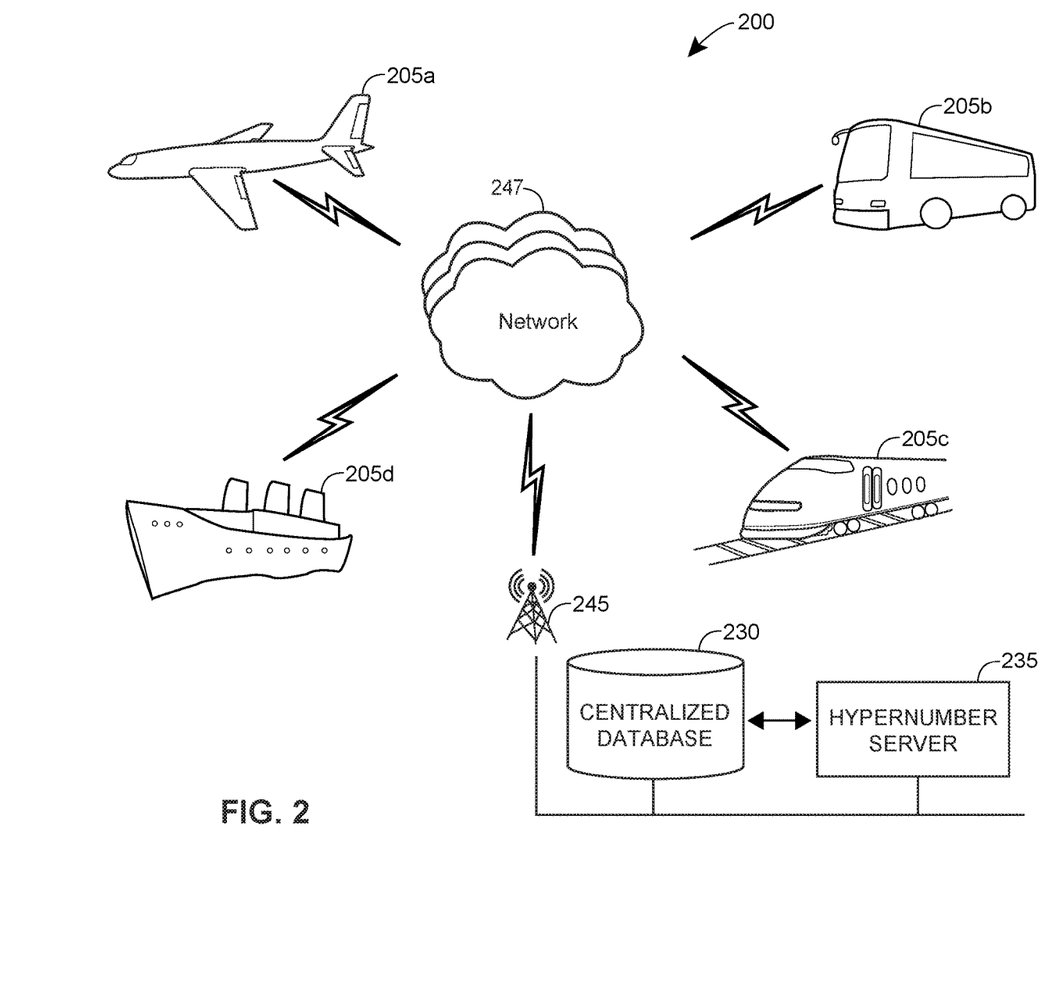
FIG. 2 illustrates an exemplary system including a plurality of different vehicle types in communication, as disclosed herein.

Turning to FIG. 2, depicted is an exemplary communication system 200 including a plurality of different vehicle types containing respective vehicle-based networks, as described herein. In particular, the communication system 200 includes an airplane 205a (such as the vehicle 105), a bus 205b, a train 205c, and a boat 205d, each equipped with respective vehicle-based networks.

Each of the vehicles 205a-d may be in communication with a terrestrial base station 245 (such as the terrestrial base station 145) via a network 247 comprised of respective external communication links (such as one or more of the external communication links 147). In some embodiments, the terrestrial base station 245 may actually be located on a nautical platform or other physical structure disposed in a body of water. The terrestrial base station 245 may be interconnected with a centralized database 230 (such as the centralized database 130) and a hypernumber server 235 (such as the hypernumber server 135). In the communication system 200, the centralized database 230 may store a dynamic phonebook for electronic devices aboard each of the vehicles 205a-d. Accordingly, the centralized database 230 may maintain the current location and/or routing information for each of the electronic devices to support the hypernumber portability capabilities described herein.

While FIG. 2 depicts each of the vehicles 205a-d in communication with the terrestrial base station 245, it is envisioned that each of the vehicles 205a-d may be in communication with any number of terrestrial base stations. To this end, the communication system 200 may contain a plurality of terrestrial base stations disposed across a transport network enabling the vehicles 205a-d to communicate over the network 247 throughout the course of a journey.

Figure 3:
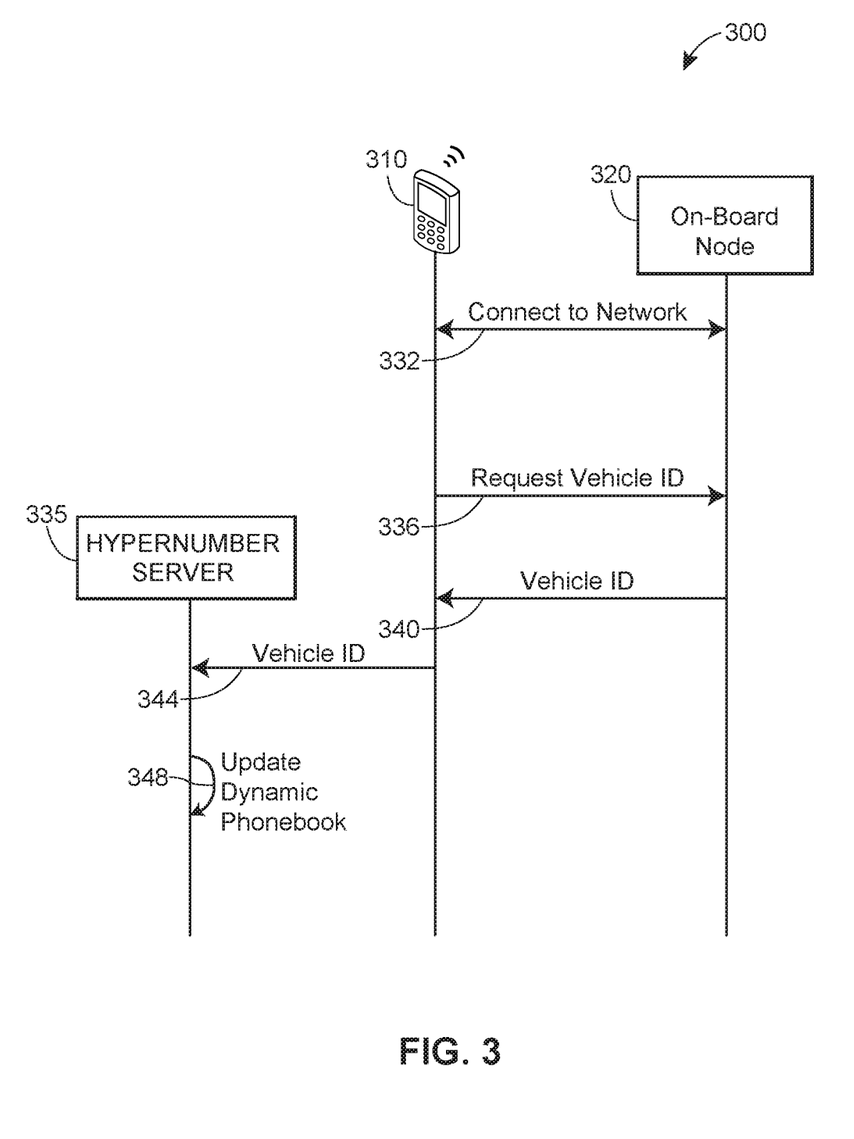
FIG. 3 illustrates an example signal diagram in which an electronic device, such as one of the electronic devices 110 of FIG. 1, updates a centralized database with its location.

Turning to FIG. 3, illustrated is an example signal diagram 300 in which an electronic device 310 (such as one of the electronic devices 110) updates a dynamic phonebook associated with a hypernumber server 335 (such as one of the hypernumber servers 135 or 235) with updated location information. In an embodiment, an application that supports the hypernumber capabilities described herein is installed on the electronic device 310. According to aspects, an individual may carry the electronic device 310 onto a vehicle (such as the vehicle 102) equipped with an on-board node 320 (such as the on-board node 120) to support a vehicle-based network (not depicted).

The signal diagram 300 may begin when the electronic device 310 interacts with the on-board node 320 to connect (332) to the vehicle-based network. For example, when the individual carries the electronic device 310 aboard the vehicle, the electronic device 310 may be within the coverage of the vehicle-based network. In response to detecting the presence of the vehicle-based network, the electronic device 310 may automatically attempt to register with the vehicle-based network. In some embodiments, the application may include a credential that permits the electronic device 310 to connect to the vehicle-based network. For example, the credential may be an identity of the electronic device and/or the application. In these embodiments, the credential may be transmitted to the on-board node 320 for verification as part of the registration process. In any event, the electronic device 310 may become connected to the vehicle-based network after registering with the on-board node 320.

Subsequent to connecting to the vehicle-based network, the electronic device 310 may transmit (336) a request for a vehicle identification to the on-board node 320 via the vehicle-based network. The vehicle identification may be a tail number, a hull number, a media access control (MAC) address, and/or other values unique to a particular vehicle. To this end, the on-board node 320 may store the vehicle identification at a memory therein. In some embodiments, the vehicle identification may be stored in a one-time programmable (OTP) memory such that it cannot be modified after initialization.

According to aspects, the request may be an HTTP request, such as an HTTP RESTful service command. The request may be configured to identify a name of the parameter used as the vehicle identification as described herein (e.g., vehicleID). Of course, other known and/or yet undeveloped languages and/or protocols suitable for querying data accessible by the on-board node 320 may be utilized without departing from the spirit of the present disclosure.

Further, the application may be configured to cause the electronic device 310 to transmit the request shortly after each time the electronic device 310 connects to a new network. In this example, it should be appreciated that the electronic device 310 may transmit the request when connecting to networks not configured to process the request. It should be appreciated that if the request is transmitted when the electronic device 310 is connected to network not configured to interpret the vehicle identification request (e.g., a network other than a vehicle- or port-based network), the electronic device 310 may receive an error message/status code or no response at all (as determined by the expiration of a wait interval associated with the request). In these scenarios, the electronic device 310 may continue normal operation without updating the hypernumber server 335 as to the update location of the electronic device 310.

In some embodiments, the application may instead analyze a Service Set Identifier (SSID) corresponding to the vehicle-based network to determine that the vehicle-based network is, in fact, a wireless network associated with a vehicle. For example, the application may include a list or an expected format of SSIDs associated with vehicle-based networks. In these embodiments, the electronic device 310 may only transmit the request if the SSID is indicative of a wireless network associated with a vehicle.

In any event, after the electronic device 310 transmits the vehicle identification request over the vehicle-based network supported by the on-board node 320, electronic device 310 may receive (340) a response from on-board node 320 including the requested vehicle identification. According to aspects, the on-board node 320 may be configured to respond the vehicle identification request by querying the vehicle identification parameter stored therein. The on-board node 320 may then format the queried vehicle identification into a response message in accordance with the language and/or protocol the electronic device 310 utilized for the request.

According to aspects, when the electronic device 310 receives the vehicle identification from the on-board node 320, the electronic device may analyze the vehicle identification to determine whether the location of the electronic device 310 has changed. For example, in embodiments where the electronic device 310 transmits the request whenever the electronic device 310 connects to a network, if the electronic device temporarily disconnects and reconnects to the vehicle-based network, the received vehicle identification will be the same as the one associated with the previous location of the electronic device 310. Accordingly, the location of the electronic device 310 may not have changed, thus there is no need to update the hypernumber server 335 with an updated location. Conversely, if the electronic device 310 was just carried onto the vehicle by the individual, the location of the electronic device 310 may have changed from a state indicative of a "home" status to a state indicative of the vehicle identification. In this example, the electronic device 310 may determine that the location of the electronic device 310 has updated based upon the location state change. As another example, a smartphone corresponding to port personnel may connect to the vehicle-based network for each vehicle the port personnel services. Accordingly, if the location for the port personnel changes from one vehicle to another vehicle, it is also indicative that the location of the smartphone has changed. If the electronic device 310 determines that the location of the electronic device 310 has changed, the electronic device 310 may then inform the hypernumber server 335 that the electronic device 310 has moved to a new location.

To this end, the electronic device 310 may transmit (344) an update message to the hypernumber server 335 via one or more external communication links (such as the external communication links 147) interconnected with the on-board node 320. More particularly, the electronic device 310 may transmit a message to the hypernumber server 335 indicating the location of the electronic device 310 has changed such that the electronic device 310 is now at a location corresponding to the vehicle identification received from the on-board node 320. In addition to the vehicle identification, the update message may include a device identifier, such as an identification of the electronic device 310, the application, and/or the corresponding hypernumber.

Subsequent to receiving the update message, the hypernumber server 335 may extract the information included in the update message to update (348) the dynamic phonebook accordingly. In an embodiment, the hypernumber server 335 may use the extracted device identifier to identify the record in the dynamic phonebook that will be associated with the extracted vehicle identification. The hypernumber server 335 may then update a location field in the identified record to indicate that the corresponding electronic device (i.e., the electronic device 310) is now located at a location corresponding to the extracted vehicle identification. Accordingly, in response to the electronic device 310 transmitting the update message, the electronic device 310 is now associated with the vehicle in the dynamic phonebook. Although the signal diagram 300 depicts the electronic device 310 updating the dynamic phonebook via communications with the hypernumber server 335, it should be appreciated that in some embodiments, the electronic device 310 may directly update the dynamic phonebook without communicating with the hypernumber server 335.

According to aspects, the hypernumber server 335 may also receive messages from the on-board node 320 indicating a change in transit state by the vehicle. The transit states may include being located at a port/gate, egress from a port/gate, mid-journey, and/or ingress to a port. In response to the hypernumber server 335 receiving an updated transit state from the on-board node 320, the hypernumber server 335 may update the dynamic phonebook with the appropriate routing information for each electronic device aboard the vehicle. As described above, calls terminated at the hypernumber corresponding to the electronic device 310 may be routed over different external communication links based upon the transit state of the vehicle in which the electronic device 310 is aboard. For example, if the electronic device 310 is located aboard an aircraft in flight, a call originated to the corresponding hypernumber may be routed over a satellite-based communication link; whereas if the electronic device 310 is located aboard an aircraft at an airport gate, a call originated to the corresponding hypernumber may be routed over a terrestrial mobile network communication link. Accordingly, when the electronic device 310 and the vehicle are associated in the dynamic phonebook, as the vehicle changes transit states the dynamic phonebook may maintain accurate routing information for calls originated to the electronic device 310.

Figures 4A, 4B:
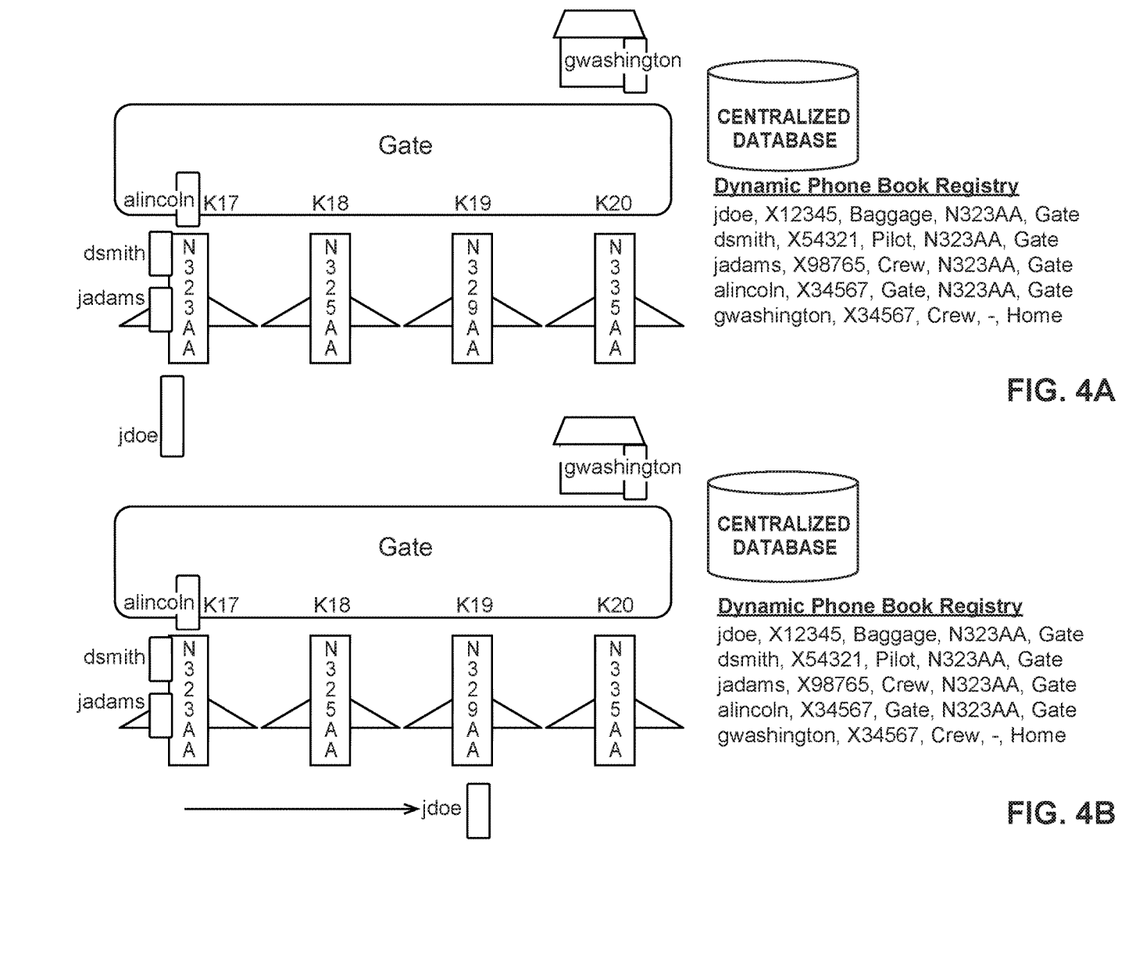
FIGS. 4A and 4B depict example scenarios in which electronic devices traverse a transport network and the corresponding updates to a dynamic phonebook.

As one such example, FIGS. 4A and 4B depict a scenario in which electronic devices (such as the plurality of electronic devices 110) traverse a transport network and the corresponding changes in location as represented in a dynamic phonebook stored at a centralized database (such as one of the centralized databases 130 or 230). In particular, FIG. 4A depicts an aircraft baggage worker loading or unloading a first aircraft (aircraft N323AA). FIG. 4B depicts the baggage worker now loading or unloading a second aircraft (aircraft N329AA) after the baggage worker has finished loading loading/unloading the first aircraft. As depicted in FIGS. 4A and 4B, for each electronic device that supports the hypernumber portability capabilities described herein, the dynamic phonebook may store the name of the device owner/user, the phone number corresponding to the hypernumber, the role of the device owner/user, a vehicle identity (if applicable), and a transit state. It should be appreciated that the dynamic phonebook may maintain additional, fewer, or alternative data associated with each electronic device.

Starting with the scenario depicted in FIG. 4A, the dynamic phonebook is associated with five electronic devices: jdoe, dsmith, jadams, alincoln, and gwashington. In this scenario, due to their proximity to aircraft N323AA, alincoln, dsmith, jadams, and jdoe are each connected to the vehicle-based network corresponding to aircraft N323AA. Accordingly, when their electronic devices connected to the N323AA vehicle-based network, their electronic devices updated the dynamic phonebook to indicate this location (shown by each entry having N323AA in the vehicle identity field). Conversely, gwashington is not connected any vehicle-based network (e.g., gwashington is home), and thus the vehicle identity for gwashington is a NULL (or other placeholder) value.

Turning to the scenario depicted in FIG. 4B, jdoe is now located at aircraft N329AA. Accordingly, when jdoe's electronic device was carried within proximity of aircraft N329AA, the electronic device connected to the N329AA vehicle-based network. In response to connecting to the N329AA vehicle-based network, the electronic device transmitted an update message to the dynamic phonebook. As a result, the vehicle identity field of jdoe's phonebook entry has changed from N323AA to N329AA. Obviously, scenarios other than the one depicted in FIGS. 4A and 4B may involve other changes to the dynamic phonebook. As one example, when aircraft N323AA takes off, the dynamic phonebook may indicate a transit state of midflight. Accordingly, the dynamic phonebook may query a transport schedule (or other data store) to populate the dynamic phonebook with an airline flight number, an origination port, and a destination port for each phonebook entry associated with an electronic device connected to the N323AA vehicle-based network.

Figure 5:
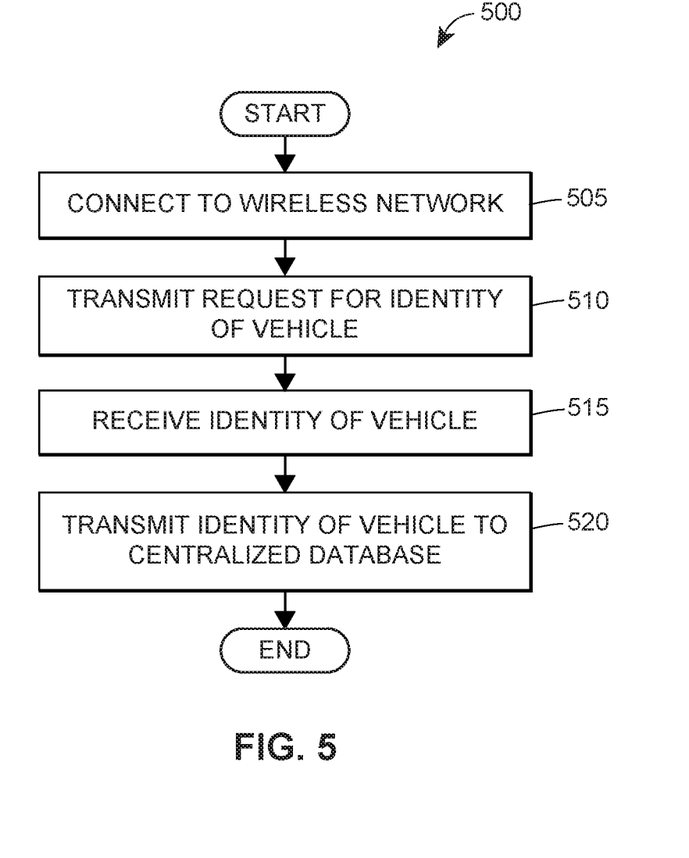
FIG. 5 is an example flow diagram of an example method for updating a location of an electronic device in a dynamic phonebook, which may be performed by one of the electronic devices 110 of FIG. 1.

Referring now to FIG. 5, FIG. 5 depicts an example method 500 for updating a dynamic phonebook (such as a dynamic phonebook within one the centralized database 130) with updated location information. The method may be performed by an electronic device (such as one of the electronic devices 110 or the electronic device 310) in communication with an on-board node (such as one of the on-board nodes 120 or 320) and the dynamic phonebook.

The method 500 may begin when the electronic device interacts with the on-board node to connect to a wireless network (block 505). More particularly, the electronic device may connect to a vehicle-based network supported by the on-board node. In response, the electronic device may transmit a request to the on-board node for an identity of the vehicle that the on-board is housed inside (block 510). The on-board node may reply to the request by transmitting a vehicle identification burned into a memory therein. As a result, the electronic device may receive the vehicle identification (block 515).

Upon receiving the identity of the vehicle, the electronic device may determine that the electronic device is located at a new location within a transport network. Accordingly, to maintain hypernumber portability as the vehicle traverses the transport network, the electronic device may transmit the vehicle identification to a centralized hypernumber database (block 520). In response, a dynamic phonebook maintained as part of the centralized hypernumber database may be update to associate the electronic device with the vehicle.

Figure 6:
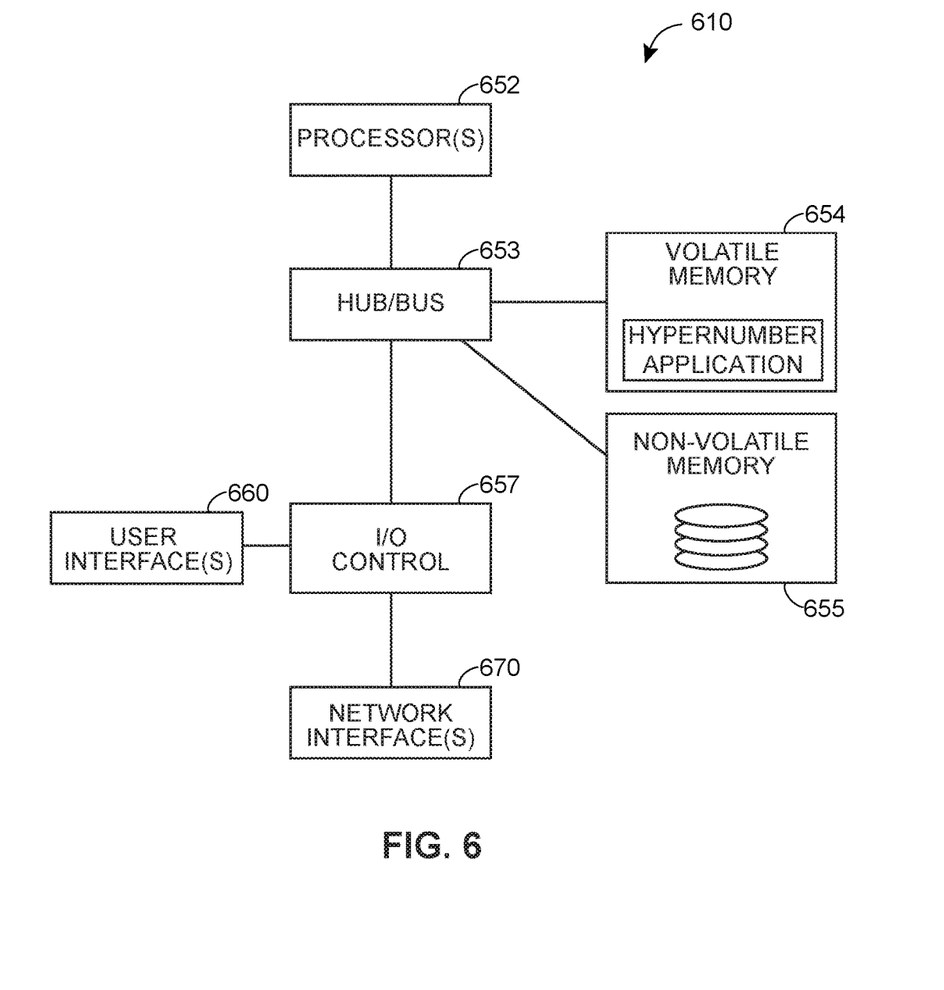
FIG. 6 is a block diagram of an electronic device, such as one of the electronic devices 110 of FIG. 1, capable of supporting hypernumber portability.

FIG. 6 illustrates a block diagram of an example electronic device 610 (such an electronic device of one of the pluralities of electronic devices 110 or the electronic device 310) that may be capable of supporting hypernumber portability. The electronic device 610 may include, for example, one more central processing units (CPUs) or processors 652, and one or more busses or hubs 653 that connect the processor(s) 652 to other elements of electronic device 610, such as a volatile memory 654, a non-volatile memory 655, and an I/O controller 657. The volatile memory 654 and the non-volatile memory 655 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 654 and/or the memory 655 may store a hypernumber application 658 that is executable by the processor 652. To this end, the hypernumber application 658 may include a set of instructions that, when executed by the processor 652, cause the electronic device to perform various functions described elsewhere herein. For example, the hypernumber application 658 may include instructions that detect when the electronic device 610 has connected to a new network and, in response, attempt to determine a vehicle identification associated with the network. As another example, the hypernumber application 658 may include routing information to enable communications with a centralized database and/or a hypernumber server. The memory 654 and/or the memory 655 may further store other instructions beyond the hypernumber application 658.

In an embodiment, the I/O controller 657 may communicate with the processor(s) 652 to transfer information and commands to/from the user interface 660, which may include a button, a slider, a keyboard, a soft key, lights, a speaker, a microphone, etc. In an embodiment, at least portions of the display device 659 and of the user interface 660 are combined in a single, integral device, e.g., a touch screen. Additionally, data or information may be transferred to and from the electronic device 610 via a network interface 670. In some embodiments, the electronic device 610 may include more than one network interface 670, such as an LTE interface and a Wi-Fi interface.

The illustrated electronic device 610 is only one example of an electronic device suitable to be particularly configured to support hypernumber portability. Other embodiments of the electronic device 610 may also be particularly configured to support hypernumber portability, even if the other embodiments have additional, fewer, or alternative components than shown in FIG. 6, have one or more combined components, or have a different configuration or arrangement of the components. Moreover, the various components shown in FIG. 6 can be implemented in hardware, a processor executing software instructions, or a combination of both hardware and a processor executing software instructions, including one or more signal processing and/or application specific integrated circuits.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A method for facilitating hypernumber portability on an electronic device having one or more processors and an application executing on the electronic device, the method comprising connecting, by the electronic device, to a wireless network corresponding to a vehicle; in response to connecting to the wireless network, the application causing the electronic device to transmit, via the wireless network, a request for an identity of the vehicle; receiving, by the electronic device and via the wireless network, the identity of the vehicle; and the application causing the electronic device to transmit, to a hypernumber server or a centralized hypernumber database that includes a dynamic phonebook, the identity of the vehicle, wherein transmitting the identity of the vehicle causes the centralized hypernumber database to associate the electronic device with the vehicle.

2. The method of the previous aspect, wherein connecting to the wireless network further comprises the application causing the electronic device to transmit a credential that permits the electronic device to access the wireless network.

3. The method of any combination of the preceding aspects, wherein the identity of the vehicle is at least one of a tail number, a hull number, or a Media Access Control (MAC) address.

4. The method of any combination of the preceding aspects, wherein transmitting the request for the identity of the vehicle further comprises analyzing, by the one or more processors, a Service Set Identifier (SSID) of the wireless network to determine that the wireless network is a vehicle-based wireless network.

5. The method of any combination of the preceding aspects, further comprising analyzing, by the one or more processors, the received identity of the vehicle to determine that the electronic device has changed locations.

6. The method of any combination of the preceding aspects, wherein the identity of the vehicle is not transmitted to the centralized hypernumber database unless the electronic device has changed locations.

7. The method of any combination of the preceding aspects, wherein determining that the electronic device has changed locations comprises at least one of determining, by the one or more processors, that the electronic device previously was located in a home location, or determining, by the one or more processors, that the electronic device previously was located in a location associated with a second vehicle.

8. The method of any combination of the preceding aspects, wherein transmitting the identity of the vehicle further comprises transmitting, to the hypernumber server or the centralized hypernumber database, an identity of at least one of the electronic device or the application.

9. The method of any combination of the preceding aspects, wherein transmitting the identity of the vehicle causes the centralized hypernumber database to update routing information for calls terminated at the electronic device in response to the vehicle changing transit states.

10. A system comprising one or more processors; one or more non-transitory, computer-readable storage media storing computer-executable instructions wherein a portion of the instructions are included in a hypernumber application, and wherein when the instructions are executed by the one or more processors, the instructions cause the system to connect to a wireless network corresponding to a vehicle, in response to connecting to the wireless network, transmit, via the wireless network, a request for an identity of the vehicle, receive, via the wireless network, the identity of the vehicle, and transmit, to a hypernumber server or a centralized hypernumber database that includes a dynamic phonebook, the identity of the vehicle, wherein transmitting the identity of the vehicle causes the centralized hypernumber database to associate the electronic device with the vehicle.

11. The system of the previous aspect, wherein to connect to the wireless network, the instructions, when executed by the one or more processors, further cause the system to transmit a credential that permits the electronic device to access the wireless network.

12. The system of any combination of aspects 10 to 11, wherein the identity of the vehicle is at least one of a tail number, a hull number, or a Media Access Control (MAC) address.

13. The system of any combination of aspects 10 to 12, wherein to transmit the request for the identity of the vehicle, the instructions, when executed by the one or more processors, further cause the system to analyze, by the one or more processors, a Service Set Identifier (SSID) of the wireless network to determine that the wireless network is a vehicle-based wireless network.

14. The system of any combination of aspects 10 to 13, wherein the instructions, when executed by the one or more processors, further cause the system to analyze, by the one or more processors, the received identity of the vehicle to determine that the electronic device has changed locations.

15. The system of any combination of aspects 10 to 14, wherein the identity of the vehicle is not transmitted to the centralized hypernumber database unless the electronic device has changed locations.

16. The system of any combination of aspects 10 to 15, wherein to determine that the electronic device has changed locations, the instructions, when executed by the one or more processors, further cause the system to determine, by the one or more processors, at least one of that the electronic device previously was located in a home location, or that the electronic device previously was located in a location associated with a second vehicle.

17. The system of any combination of aspects 10 to 16, wherein to transmit the identity of the vehicle, the instructions, when executed by the one or more processors, further cause the system to transmit, to the hypernumber server or the centralized hypernumber database, an identity of at least one of the electronic device or the application.

18. The system of any combination of aspects 10 to 17, wherein transmitting the identity of the vehicle causes the centralized hypernumber database to update routing information for calls terminated at the electronic device in response to the vehicle changing transit states.

19. A non-transitory computer-readable storage medium storing processor-executable instructions, that when executed cause one or more processors to connect to a wireless network corresponding to a vehicle; in response to connecting to the wireless network, transmit, via the wireless network, a request for an identity of the vehicle; receive, via the wireless network, the identity of the vehicle; and transmit, to a hypernumber server or a centralized hypernumber database that includes a dynamic phonebook, the identity of the vehicle, wherein transmitting the identity of the vehicle causes the centralized hypernumber database to associate the electronic device with the vehicle.

20. The non-transitory computer-readable storage medium of the previous aspect, wherein transmitting the identity of the vehicle causes the centralized hypernumber database to update routing information for calls terminated at the electronic device in response to the vehicle changing transit states.

What is claimed is:

1. A method for facilitating hypernumber portability on an electronic device having one or more processors and an application executing on the electronic device, the method comprising:
   connecting, by the electronic device, to a wireless network corresponding to a vehicle;
   in response to connecting to the wireless network, the application causing the electronic device to transmit, via the wireless network, a request for an identity of the vehicle;
   receiving, by the electronic device and via the wireless network, the identity of the vehicle; and
   the application causing the electronic device to transmit, to a hypernumber server or a centralized hypernumber database that includes a dynamic phonebook, the identity of the vehicle, wherein transmitting the identity of the vehicle causes the centralized hypernumber database to associate the electronic device with the vehicle.

2. The method of claim 1, wherein connecting to the wireless network further comprises:
   the application causing the electronic device to transmit a credential that permits the electronic device to access the wireless network.

3. The method of claim 1, wherein the identity of the vehicle is at least one of: a tail number, a hull number, or a Media Access Control (MAC) address.

4. The method of claim 1, wherein transmitting the request for the identity of the vehicle further comprises:
   analyzing, by the one or more processors, a Service Set Identifier (SSID) of the wireless network to determine that the wireless network is a vehicle-based wireless network.

5. The method of claim 1, further comprising:
   analyzing, by the one or more processors, the received identity of the vehicle to determine that the electronic device has changed locations.

6. The method of claim 5, wherein the identity of the vehicle is not transmitted to the centralized hypernumber database unless the electronic device has changed locations.

7. The method of claim 5, wherein determining that the electronic device has changed locations comprises at least one of:
   determining, by the one or more processors, that the electronic device previously was located in a home location, or
   determining, by the one or more processors, that the electronic device previously was located in a location associated with a second vehicle.

8. The method of claim 1, wherein transmitting the identity of the vehicle further comprises:
   transmitting, to the hypernumber server or the centralized hypernumber database, an identity of at least one of the electronic device or the application.

9. The method of claim 1, wherein transmitting the identity of the vehicle causes the centralized hypernumber database to update routing information for calls terminated at the electronic device in response to the vehicle changing transit states.

10. A system comprising:
    one or more processors;
    one or more non-transitory, computer-readable storage media storing computer-executable instructions wherein a portion of the instructions are included in a hypernumber application, and wherein when the instructions are executed by the one or more processors, the instructions cause the system to:
    connect to a wireless network corresponding to a vehicle,
    in response to connecting to the wireless network, transmit, via the wireless network, a request for an identity of the vehicle,
    receive, via the wireless network, the identity of the vehicle, and
    transmit, to a hypernumber server or a centralized hypernumber database that includes a dynamic phonebook, the identity of the vehicle, wherein transmitting the identity of the vehicle causes the centralized hypernumber database to associate the electronic device with the vehicle.

11. The system of claim 10, wherein to connect to the wireless network, the instructions, when executed by the one or more processors, further cause the system to:
    transmit a credential that permits the electronic device to access the wireless network.

12. The system of claim 10, wherein the identity of the vehicle is at least one of: a tail number, a hull number, or a Media Access Control (MAC) address.

13. The system of claim 10, wherein to transmit the request for the identity of the vehicle, the instructions, when executed by the one or more processors, further cause the system to:
    analyze, by the one or more processors, a Service Set Identifier (SSID) of the wireless network to determine that the wireless network is a vehicle-based wireless network.

14. The system of claim 10, wherein the instructions, when executed by the one or more processors, further cause the system to:
    analyze, by the one or more processors, the received identity of the vehicle to determine that the electronic device has changed locations.

15. The system of claim 14, wherein the identity of the vehicle is not transmitted to the centralized hypernumber database unless the electronic device has changed locations.

16. The system of claim 14, wherein to determine that the electronic device has changed locations, the instructions, when executed by the one or more processors, further cause the system to determine, by the one or more processors, at least one of:

that the electronic device previously was located in a home location, or that the electronic device previously was located in a location associated with a second vehicle.

17. The system of claim 10, wherein to transmit the identity of the vehicle, the instructions, when executed by the one or more processors, further cause the system to:

transmit, to the hypernumber server or the centralized hypernumber database, an identity of at least one of the electronic device or the application.

18. The system of claim 10, wherein transmitting the identity of the vehicle causes the centralized hypernumber database to update routing information for calls terminated at the electronic device in response to the vehicle changing transit states.

19. A non-transitory computer-readable storage medium storing processor-executable instructions, that when executed cause one or more processors to:

connect to a wireless network corresponding to a vehicle;

in response to connecting to the wireless network, transmit, via the wireless network, a request for an identity of the vehicle;

receive, via the wireless network, the identity of the vehicle; and transmit, to a hypernumber server or a centralized hypernumber database that includes a dynamic phonebook, the identity of the vehicle, wherein transmitting the identity of the vehicle causes the centralized hypernumber database to associate the electronic device with the vehicle.

20. The non-transitory computer-readable storage medium of claim 19, wherein transmitting the identity of the vehicle causes the centralized hypernumber database to update routing information for calls terminated at the electronic device in response to the vehicle changing transit states.

* * * * *